United States Patent Office 3,472,878
Patented Oct. 14, 1969

3,472,878
N-(HYDROXYARYL)ACONAMIDES
Francois T. Bruderlein, Montreal, Quebec, Canada, assignor to American Home Products Corporation, New York, N.Y., a corporation of Delaware
No Drawing. Continuation-in-part of application Ser. No. 624,207, Mar. 20, 1967. This application Jan. 27, 1969, Ser. No. 794,423
Int. Cl. C07d 5/32; A61k 21/00
U.S. Cl. 260—343.6                                    11 Claims

ABSTRACT OF THE DISCLOSURE

There are disclosed herein aconamides substituted on the nitrogen with phenyl or naphthyl groups which are in turn substituted with hydroxy, methoxy, methyl and nitro radicals. The compounds are useful as anti-bacterial and trichomonicidal agents and formulations for their use as well as a process for their preparation are also given.

---

This application is a continuation-in-part of Ser. No. 624,207, filed Mar. 20, 1967, now abondoned.

The present invention relates to novel aromatic aconic acid amides in which the aromatic moiety is selected from the group consisting of phenyl and naphthyl groups substituted with hydroxy, methoxy, methyl, and nitro radicals.

The compounds of this invention have been found to possess interesting pharmacological properties. More particularly, those compounds, in standard pharmacological tests, for example, in modifications of the tests for determining anti-bacterial or trichomonicidal activities by the serial dilution tube techniques described by Rammelkamp in Proc. Soc. Exp. Biol. Med., vol. 51, p. 95 (1942), or by Grove and Randall, in Assay Methods of Antibiotics, Medical Encyclopedia Inc., N.Y., 1955, have exhibited utility as anti-bacterial agents effective against *Staphylococcus pyogenes, Sarcina lutea, Streptococcus fecalis, Escherichia coly, Aerobacter aerogenes, Salmonella pullorum, Pseudomonas aeruginosa, Proteus mirabilis, Proteus vulgaris* and *Trichomonas foetus*.

The compounds of this invention are preferably employed as anti-bacterial or trichomonicidal agents for topical application, in the form of solutions, suspensions, creams, jellies, or lotions containing from 0.1 to 1.0 percent of the active ingredient together with suitable excipients. They may be administered topically from 1 to 4 times per day.

The compounds of this invention are more particularly described as hydroxy-aryl aconic acid amides and may be represented by the following general formula

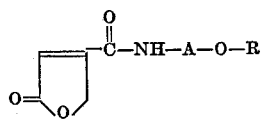

in which A represents an aromatic group such as, for example, the phenyl or the naphthyl group, which may in turn be further substituted with a methyl, a methoxy, or a nitro group, and R represents hydrogen or the methyl group.

More specifically, the compounds of this invention may be prepared by reacting an aconyl halide, such as for example, aconyl chloride with the suitable aminophenol or aminonaphthol, preferably in a non-polar solvent such as, for example, benzene, methylethyl ketone or tetrahydrofuran within a temperature range from room temperature to the reflux temperature of the mixture preferably within a range of from 60 to 100° C. The reaction is usually complete within a period of time of from 0.5 to 12 hours, and the reaction product is isolated from the reaction mixture either by filtration or by concentrating the reaction mixture to dryness and crystallizing the product from ethanol.

The following formulae, in which A and R have the significance defined above, and examples will illustrate this invention.

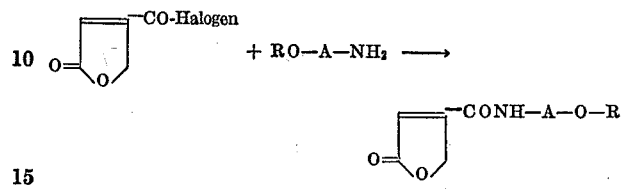

EXAMPLE 1

N-(2'-hydroxyphenyl)aconamide

To 5 g. of o-aminophenol in 150 ml. of methyl ethyl ketone 6.7 g. of aconyl chloride (prepared according to the method described by A. Funke et al. in Bull. Soc. Chim. France, 1950, p. (346), are added with efficient stirring and the reaction mixture is refluxed for one hour and then left overnight at room temperature. After filtration, the precipitate is crystallized from ethanol and the title product is isolated with M.P. 215–220° C.

In the same manner but using m-aminophenol or p-aminophenol, respectively, as starting materials instead of o-aminophenol; the corresponding 3'-hydroxyphenyl (M.P. 215–220° C.) and 4'-hydroxyphenyl (M.P. 229–233° C.) aconamides are respectively obtained.

EXAMPLE 2

N-1'-(2'-hydroxynaphthyl)aconamide

To 5.15 g. of 1-amino-2-naphthol in 100 ml. of tetrahydrofuran 4.8 g. of aconyl chloride are added slowly with stirring. The reaction mixture is then refluxed for 2.5 hours. After cooling and concentrating the solution, the title product is filtered off and crystallized from ethanol. It melts at 235–237° C.

EXAMPLE 3

N-(2'-hydroxy-5'-methylphenyl)aconamide

Equivalent quantities of aconyl chloride and 3-amino-4-hydroxytoluene in tetrahydrofuran are refluxed for 1 hour. After concentration to dryness, the title product is crystallized from ethanol to M.P. 228–230° C.

EXAMPLE 4

N-(2'-hydroxy-5'-nitrophenyl)aconamide 2-amino-4-nitrophenyl (5 g.) and aconyl chloride (4.74 g.) in 85 ml. of tetrahydrofuran are refluxed for 4½ hours. The reaction mixture is then charcoaled and concentrated to dryness. The title product is crystallized from ethanol to M.P. 226–227° C.

EXAMPLE 5

N-(2'-methoxyphenyl)-aconamide

To 6.6 g. of o-anisidine in 70 ml. of tetrahydrofuran 6.6 g. of aconyl chloride are added and the resultant mixture is refluxed for 1 hour. At the end of that period the reaction mixture is concentrated to dryness and the residue is charcoaled and crystallized several times from ethanol, to M.P. 147–149° C.

In the same manner as described above, by using 2-hydroxy-p-anisidine instead of o-anisidine, the corresponding N-(2'-hydroxy-4'-methoxyphenyl)aconamide is obtained with M.P. 187–188° C. after crystallization from ethanol.

I claim:
1. Compounds of the formula

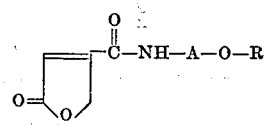

wherein R is selected from the group which consists of hydrogen, and methyl; and A is an aromatic group selected from phenyl, naphthyl, 5'-methyl substituted phenyl, 4'-methoxy substituted phenyl, 3'-nitro-substituted phenyl, 4'-nitro-substituted phenyl and 5'-nitro-substituted phenyl.

2. N-(2'-hydroxyphenyl)aconamide, as claimed in claim 1.

3. N-(3'-hydroxyphenyl)aconamide, as claimed in claim 1.

4. N-(4'-hydroxyphenyl)aconamide, as claimed in claim 1.

5. N-1'-(2'-hydroxynaphthyl)aconamide, as claimed in claim 1.

6. N-(2'-hydroxy-5'-methylphenyl)aconamide, as claimed in claim 1.

7. N-(2'-hydroxy-5'-nitrophenyl)aconamide, as claimed in claim 1.

8. N-(2'-hydroxy-4'-nitrophenyl)aconamide, as claimed in claim 1.

9. N-(2'-hydroxy-4'-methoxyphenyl)aconamide, as claimed in claim 1.

10. N-(4'-hydroxy-3'-nitrophenyl)aconamide, as claimed in claim 1.

11. N-(2'-methoxyphenyl)aconamide, as claimed in claim 1.

No references cited.

ALEX MAZEL, Primary Examiner
ANNE MARIE T. TYGHE, Assistant Examiner

U.S. Cl. X.R.
260—575; 424—279